United States Patent [19]

Krieger

[11] Patent Number: 4,823,997
[45] Date of Patent: Apr. 25, 1989

[54] CYCLE CARRIER

[75] Inventor: Joseph G. Krieger, Fort Collins, Colo.

[73] Assignee: P & J Enterprises, Inc., Fort Collins, Colo.

[21] Appl. No.: 141,296

[22] Filed: Jan. 5, 1988

[51] Int. Cl.[4] .............................................. B60R 9/06
[52] U.S. Cl. ........................... 224/42.03 B; 224/42.15
[58] Field of Search ............... 224/42.03 B, 42.03 A, 224/42.03 R, 42.06, 42.21, 42.25, 42.12, 42.15, 42.18, 42.45 R; 211/5, 20; 414/463, 464; 410/3

[56] References Cited

U.S. PATENT DOCUMENTS

| | | | |
|---|---|---|---|
| 1,327,097 | 1/1920 | Johnson | 224/42.15 |
| 2,576,222 | 11/1951 | Hill | 224/42.03 B |
| 3,504,831 | 4/1970 | Highnote | 224/42.03 B |
| 3,744,689 | 7/1973 | Kjensmo | 224/42.03 B |
| 3,853,255 | 12/1974 | Spencer | 224/42.03 B |
| 3,891,132 | 6/1975 | Chandler | 224/42.03 B |
| 3,912,139 | 10/1975 | Bowman | 410/3 |
| 4,046,297 | 9/1977 | Bland | 224/42.03 B |
| 4,646,952 | 3/1987 | Timmers | 224/42.07 |
| 4,676,413 | 6/1987 | Begun | 224/42.03 B |
| 4,676,414 | 6/1987 | Deguevara | 224/42.03 B |
| 4,705,448 | 11/1987 | Mungons | 414/462 |

Primary Examiner—Renee S. Luebke
Attorney, Agent, or Firm—Dean P. Edmundson

[57] ABSTRACT

A cycle carrier is described for detachable mounting to a vehicle hitch of the type including a tubular receiver. The carrier includes a horizontal frame and a tongue which is slidably received in the receiver of the vehicle hitch. Wheel supports are movably adjustable on the frame to accommodate cycles of different wheel bases. Retention means secure the wheels of the cycle in the wheel supports during transport. The carrier is readily detached from the vehicle hitch when it is no longer needed.

4 Claims, 3 Drawing Sheets

CYCLE CARRIER

FIELD OF THE INVENTION

This invention relates to carriers of the type attached to vehicles for carrying cycles of various types. More particularly, this invention relates to cycle carriers which are detachably mounted to an existing hitch system of a vehicle.

BACKGROUND OF THE INVENTION

The transport of a cycle (e.g. bicycle, motorcycle, off-road cycle, trail cycle, or the like) can often present problems for the owner or user. Such cycles are too large and bulky to permit them to be carried inside of a car or motorhome. Although it is possible to carry a cycle or bike in the bed of a pickup, many people do not have access to such a vehicle, or they may not want to lift the cycle to the height required to place it in the vehicle.

Therefore, it is usually necessary to obtain a trailer on which to carry the cycle and then tow the trailer behind the vehicle. This involves considerable additional expense and presents the additional problem of having to store the trailer when it isn't being used.

Many owners and users of cycles do not want to incur the additional expense of purchasing a trailer and also do not want to encounter the problems associated with pulling and storing a trailer.

Although various types of carriers have been previously proposed by others for attachment to vehicles, none of such prior carriers are entirely suitable for carrying all types of cycles. For example, some of such carriers are only capable of carrying bicycles and are not suitable for carrying larger, motorized cycles. Other carriers require essentially permanent mounting to the vehicle. Still others require the use of various mechanical fasteners to mount the carrier to the vehicle, thereby requiring the use of hand tools and some appreciable amount of time to mount the carrier on the vehicle. Some of the carriers are mounted to the vehicle bumper and are not easily detached.

Various prior carriers are described, for example, in the following U.S. Pat. Nos.: 2,576,222; 3,504,831; 3,744,689; 3,891,132; 4,046,297; 4,676,414; and 4,705,448.

There has not heretofore been provided a safe and effective cycle carrier which is simply and securely mounted to an existing vehicle hitch and which is readily detachable from the vehicle when it is no longer needed.

SUMMARY OF THE INVENTION

In accordance with the present invention there is provided a cycle carrier which is adapted to be detachably mounted to a vehicle hitch of the type including a tubular receiver. The cycle carrier comprises:

(a) an elongated frame member having first and second ends;
(b) an elongated tongue member carried by the frame member and projecting outwardly therefrom; wherein the tongue is perpendicular to the frame member; and wherein the tongue is adapted to be slidably received in the tubular receiver and detachably secured therein;
(c) first and second wheel support members carried by the ends of the frame member; wherein at least one, and preferably both, of the wheel support members is adapted to be movably adjustable on the frame member; and
(d) first and second retention means carried by the wheel support members and being adapted to retain a wheel of a cycle in each wheel support.

The frame member is disposed in a horizontal plane. The wheels of a cycle to be carried are positioned in the wheel supports and retained therein by the retention means.

The cycle carrier of the invention is very stable and safely supports a cycle for transport. The wheel supports are movably adjustable on the frame to accommodate cycles of different sizes (i.e. cycles having different wheel bases). The carrier is easily and quickly attached or detached, as necessary. It is very easily stored because it does not require very much space for storage.

The cycle carrier is especially useful for carrying a cycle to any desired location. For example, it may be attached to a recreational vehicle for carrying a trail bike or off-the-road bike on vacation. No trailer is required, and the bike can be easily placed on the carrier and taken off again.

As another example, the carrier may be attached to the hitch receiver on a car for the transport of a bicycle, trail bike, moped, motor bike, etc. to any desired location. The carrier may be attached in seconds and also quickly detached again when no longer needed.

The carrier does not interfere with operation of the vehicle, and tail lights can optionally be included on the carrier as a safety feature. The lights are operably connected to the light system of the vehicle.

Other advantages of the cycle carrier of the invention will be apparent from the following detailed description.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
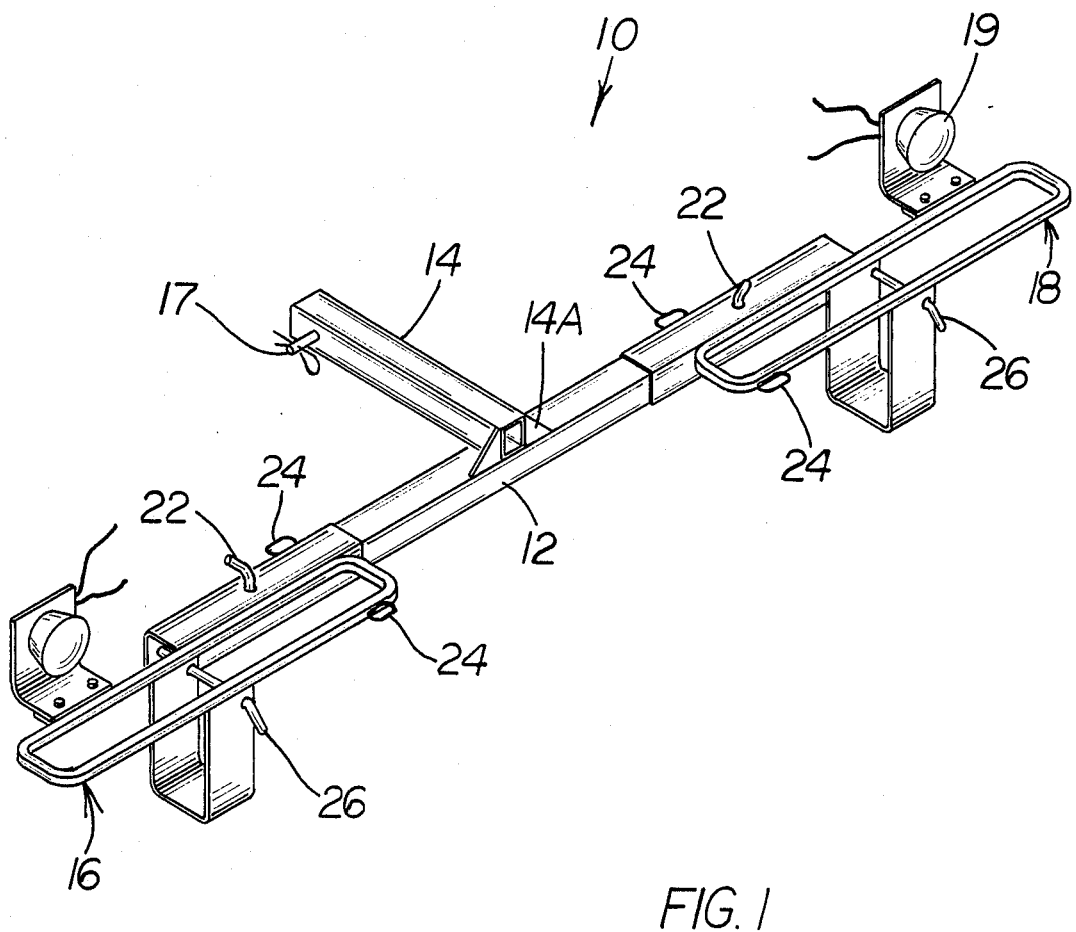
FIG. 1 is a perspective view of one embodiment of cycle carrier of the invention.
Figure 2:
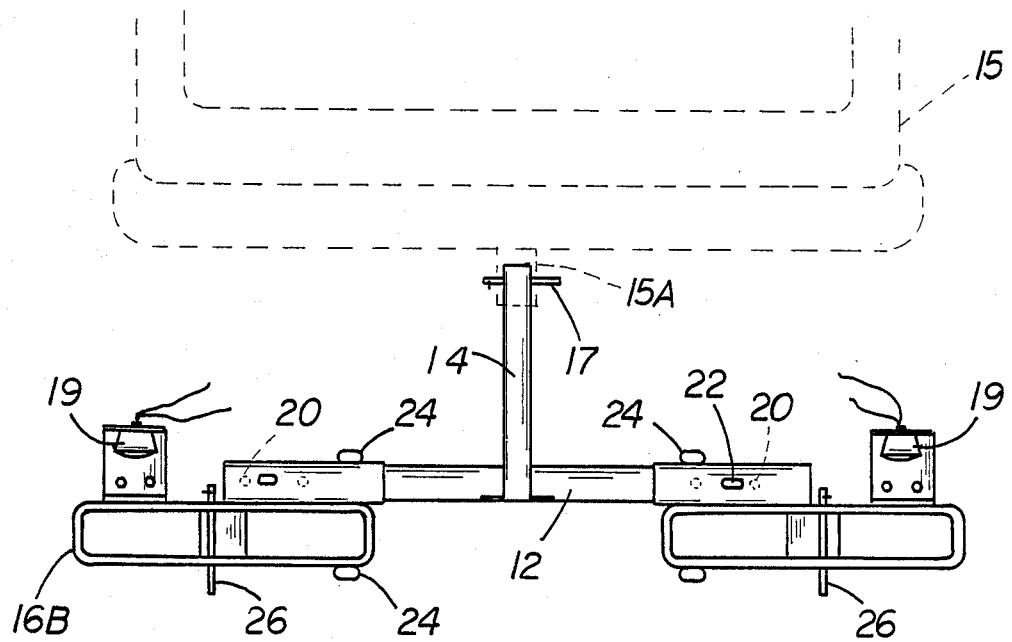
FIG. 2 is a top view of the carrier of FIG. 1 attached to the hitch receiver of a vehicle.
Figure 3:
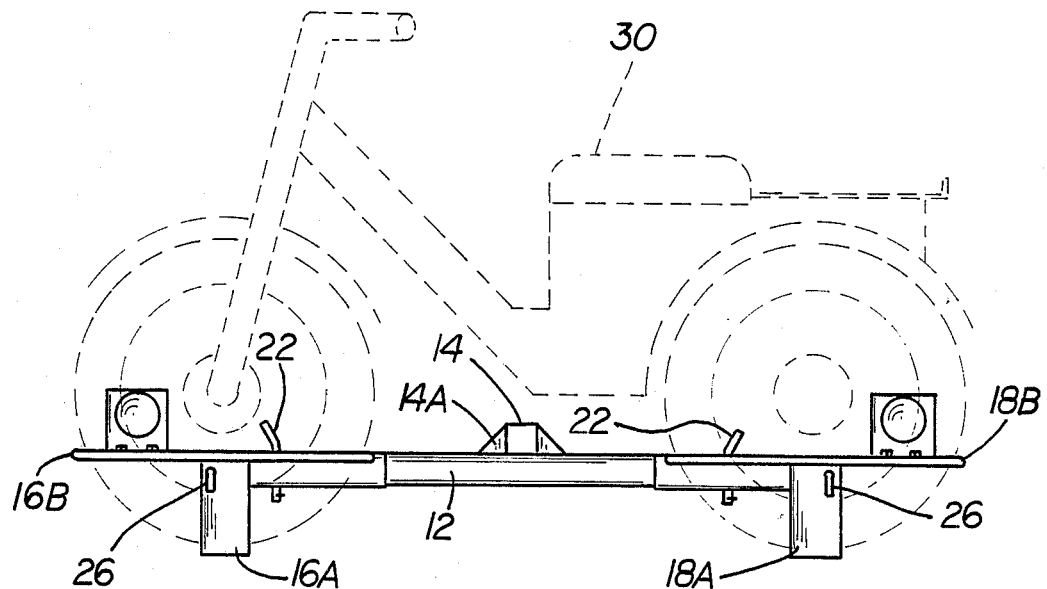
FIG. 3 is a rear view of the carrier shown in FIG. 2 illustrating the manner in which a motorized bike may be carried therewith.

In FIGS. 1-3 there is shown one embodiment of cycle carrier 10 of the invention which includes elongated frame member 12 to which is attached an elongated tongue member 14 (which is perpendicular to frame member 12). Wheel support members 16 and 18 are carried on opposite ends of frame 12.

The outer end of tongue member 14 includes at least one transverse aperture therethrough. When tongue member 14 is slidably received in the tubular receiver 15A secured to vehicle 15, pin 17 may be inserted through registering apertures in hitch receiver 15A and tongue member 14. In order to detach the carrier from the vehicle it is only necessary to remove pin 17.

The wheel support members include tubular mounting members which slidably engage the frame member and are movably adjustable (via spaced apertures 20 and removable pins 22) on the frame to accommodate the wheel base of any particular cycle to be carried. The apertures may be provided in the frame 12, as illustrated, or they may be provided in the tubular mounting members, as desired.

The wheel support members, of course, can also be taken completely off the frame member, if desired. For example, the wheel support members may be taken off in order to turn the frame member over (to selectively position the frame member below or above the tongue member). Then the wheel support members can be put back on the frame and secured.

As shown in FIG. 3, one end of the tongue member 14 is secured to the midpoint of the frame (e.g., by welding). Reinforcement plates 14A may also be welded in position to assist in supporting the tongue member, as illustrated.

Each wheel support member includes a stirrup member 16A and 18A, respectively, which extends below encirclement member 16B and 18B, respectively. When the wheels of the cycle 30 are positioned in the wheel supports 16 and 18, the stirrups 16A and 18A support the bottom of the wheels and members 16B and 18B surround the wheels to provide lateral support. If additional support for the cycle is desired, a conventional tie-down strap may be suitably passed over the cycle and secured to eyelets 24 on wheel support member 16.

In order to retain each wheel of the cycle in a respective support member on the carrier, pins 26 can be inserted through appropriate openings in opposite sides of the stirrups 16A and 18A. The pins are intended to pass between the spokes of each wheel above the lower portion of the rim so that each wheel is retained in the wheel support and is prevented from bouncing out during transport. If desired, each pin could be locked with a conventional padlock to prevent unauthorized removal.

The tongue member 14 may include a plurality of transversely extending apertures, if desired. This facilitates attachment of the tongue to the hitch receiver at different points, thereby allowing variability in the distance between the frame member and the bumper of the vehicle.

Tail lights 19 may optionally be mounted on the wheel support members, as illustrated. The lights are operatively connected to the light system of the vehicle.

Figure 4:
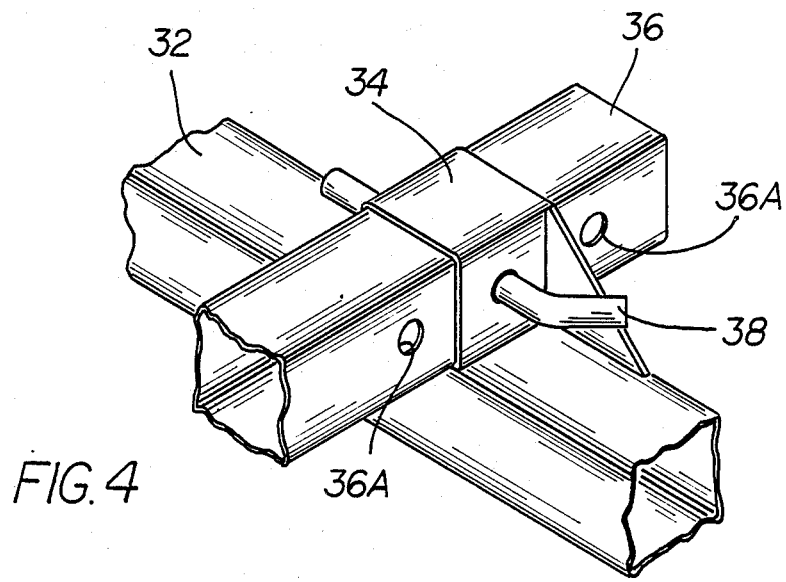
FIG. 4 is a perspective view illustrating one embodiment of tongue member which is useful in the carrier of this invention.

FIG. 4 illustrates another variation of the present invention pertaining to the tongue member. Thus, there is shown frame member 32 having secured to its midpoint a tubular housing 34 which is adapted to slidably receive one end of tongue member 36. The tongue includes a plurality of apertures 36A which extend transversely therethrough and which enable the tongue to be secured to housing 34 by means of pin 38. This arrangement allows the tongue 36 to be removed from frame 32 (e.g., for storage) and also allows the effective length of the tongue to be varied, as desired.

Figure 5:
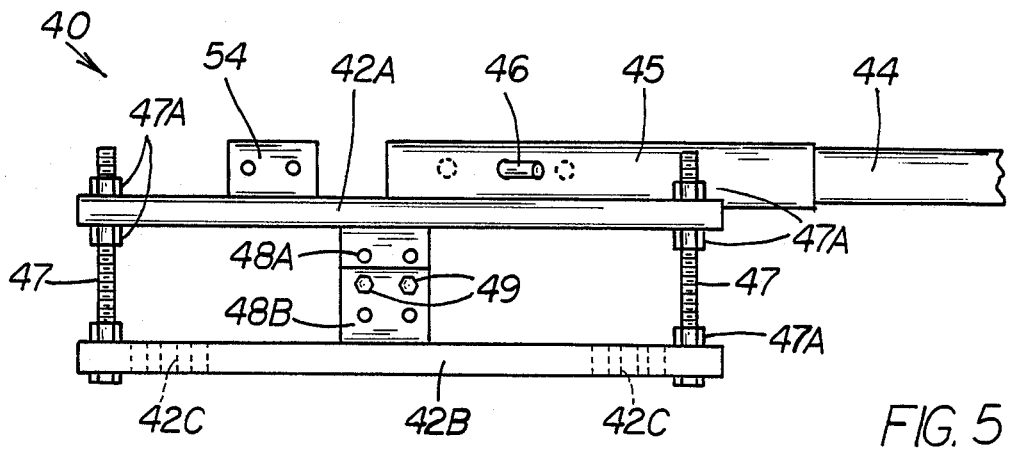
FIG. 5 is a top view of another embodiment of cycle carrier of the invention.
Figure 6:
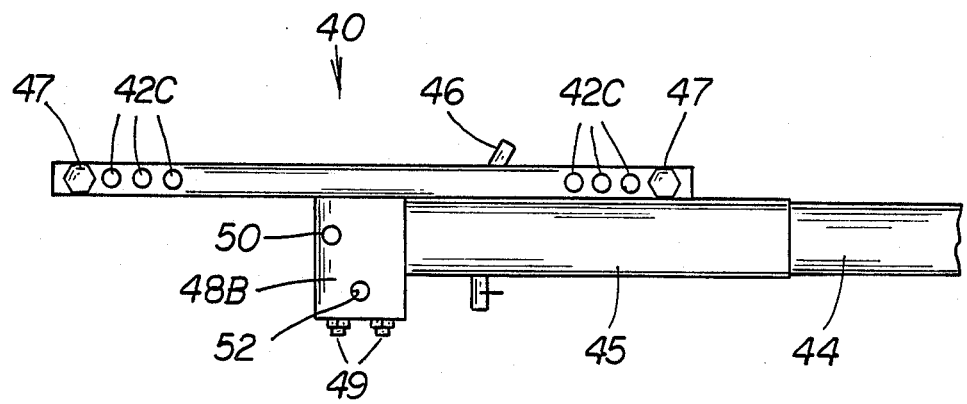
FIG. 6 is a rear view of the embodiment of carrier shown in FIG. 5.

FIGS. 5 and 6 illustrate another embodiment of cycle carrier 40 of the invention. In this embodiment there are two wheel support members (one of which is illustrated). Each wheel support is attached to one end of frame member 44 by means of tubular mounting member 45 which slidably engages frame 44. Pin 46 extends through registering apertures in mounting member 45 and frame 44. There may be a plurality of apertures in frame 44 or in mounting member 45 to facilitate attachment of the mounting member to frame 44 at a plurality of positions.

Each wheel support member includes two sections 42A and 42B which are spaced apart from each other and which are adapted to be secured together at a plurality of different spacings. This allows the width of the wheel support to vary to accommodate wheels of different widths.

Thus, threaded bolts 47 extend through each section 42A and 42B. Nuts 47A are tightened in a manner such that the desired spacing between sections 42A and 42B is maintained. Stirrup sections 48A and 48B overlap each other at their lowermost portions and bolts 49 secure them together at the desired spacing of sections 42A and 42B.

Sections 42A and 42B also include a plurality of spaced apertures 42C therealong so that bolts 47 may be inserted therethrough at any desired lateral location. This allows the effective length of each wheel support to be changed, as desired, in order to accommodate wheels of different diameters.

Pin 50 is adapted to be inserted through registering openings on opposite sides of the stirrup. Pin 50 is for retaining a wheel of a cycle in the support during transport. Opening 52 in the lower portion of the stirrup is for placement of a pin to support the bottom of a small wheel of a cycle in the support.

Bracket 54 is secured to section 42A of the wheel support and is adapted to serve as a mounting bracket for a tail light which can be operatively connected to the light system of the vehicle.

The frame member and the tongue member may be made of various materials, although square tubing is generally preferred. The length of the frame member and tongue member may also vary.

Other variants are possible without departing from the scope of the present invention. For example, a padlock may be used to secure the pin connecting the tongue member to the hitch receiver to prevent theft. Also, the tongue member may be Z-shaped so that the ends of the tongue are in different planes. This arrangement may be useful for changing the height of the frame member relative to the ground (e.g., by turning the tongue member over). Other variations and modifications will also be apparent.

What is claimed is:

1. A cycle carrier which is adapted to be detachably mounted to a vehicle hitch of the type including a square tubular receiver having a transverse aperture therethrough; said cycle carrier comprising:
   (a) an elongated frame member having first and second ends; wherein each said end includes a plurality of spaced transverse apertures therein;
   (b) an elongated tongue member carried by said frame member and projecting outwardly therefrom; wherein said tongue member is perpendicular to said frame member; and wherein said tongue member is adapted to be slidably received in said tubular receiver and detachably secured therein;
   (c) first and second wheel support members carried by said first and second ends of said frame member; wherein each said wheel support member includes first and second sections which are detachably secured together in a manner such that the spacing between said sections may be adjusted; wherein said first section includes a tubular mounting member which slidably engages said frame member and which is movably adjustable on said frame member; wherein each said mounting member includes an aperture extending transversely therethrough; wherein each said mounting member is adapted to be detachably secured to said frame member at a desired position by means of a pin extending through registering apertures in said frame member and said mounting member; wherein said first and second sections include a plurality of spaced-apart transverse apertures therethrough; wherein bolts are passed through registering apertures in said first and second sections to define the length of each said wheel support member; and wherein said length is adjustable;

(d) first and second retention means carried by said wheel support members and being adapted to retain a wheel of a cycle in each said wheel support member;

wherein said frame member is disposed in a horizontal plane; and wherein the wheels of a cycle to be carried are adapted to be received in said wheel support members and retained therein by said retention means.

2. A cycle carrier in accordance with claim 1, wherein said frame member further includes a tubular housing secured thereto at its mid-point; wherein said tongue member is adapted to be slidably received in said housing; wherein said housing and said tongue member each include transverse apertures therethrough; and wherein said tongue member is detachably secured in said housing by means of a pin when said apertures are in registry with each other.

3. A cycle carrier in accordance with claim 1, wherein said second section of each said wheel support member is detachably secured to said first section by means of bolts.

4. A cycle carrier in accordance with claim 3, wherein said first and second sections include a plurality of spaced apertures, and wherein said bolts are adapted to secure said sections together at a plurality of positions.

* * * * *